(12) United States Patent
Yoshida

(10) Patent No.: US 6,836,181 B2
(45) Date of Patent: Dec. 28, 2004

(54) FSK DEMODULATION SYSTEM

(75) Inventor: Makoto Yoshida, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 10/137,008

(22) Filed: May 1, 2002

(65) Prior Publication Data
US 2002/0167368 A1 Nov. 14, 2002

(30) Foreign Application Priority Data
May 8, 2001 (JP) ........................................ 2001-137261

(51) Int. Cl.[7] ................................................ H03D 3/04

(52) U.S. Cl. ........................ 329/300; 329/303; 375/269; 375/273

(58) Field of Search ................................. 329/300–303, 329/305; 375/268, 269, 272–274, 302, 303, 329–331

(56) References Cited

U.S. PATENT DOCUMENTS

| | | | | |
|---|---|---|---|---|
| 4,551,846 A | * | 11/1985 | Takeda et al. | 375/328 |
| 4,694,471 A | * | 9/1987 | Blesser | 375/272 |
| 5,053,717 A | * | 10/1991 | Schulz et al. | 329/300 |
| 5,056,122 A | * | 10/1991 | Price | 375/324 |
| 5,142,130 A | * | 8/1992 | Sato | 235/462.07 |
| 5,394,109 A | * | 2/1995 | Simard | 329/300 |
| 5,428,600 A | * | 6/1995 | Potier | 370/215 |
| 5,550,505 A | * | 8/1996 | Gaus, Jr. | 329/300 |
| 5,811,782 A | * | 9/1998 | Sato et al. | 235/462.01 |
| 5,818,881 A | * | 10/1998 | Guiffant et al. | 375/334 |
| 5,852,636 A | * | 12/1998 | Mathieu et al. | 375/272 |
| 6,072,998 A | * | 6/2000 | Kaku | 455/234.2 |
| 6,566,940 B2 | * | 5/2003 | Khorram | 329/300 |

* cited by examiner

Primary Examiner—Timothy P. Callahan
Assistant Examiner—An T. Luu
(74) Attorney, Agent, or Firm—Katten Muchin Zavis Rosenman

(57) ABSTRACT

A FSK demodulation system of the present invention has a means for comparing two preset values across 0, a positive side level shift amount and a negative side level shift amount, with an inputted amplitude level; and a demodulation means for performing demodulation based on the comparison result.

13 Claims, 14 Drawing Sheets

FSK DEMODULATION SYSTEM

BACKGROUND OF THE INVENTION

1. Field of the Invention

The present invention relates to FSK (frequency shift keying). More particularly, it relates to a noise-removing technology upon FSK demodulation. One example of the FSK demodulation is Caller ID service which is one of telephone services. In this service, FSK is used for performing data communication of the caller ID.

2. Description of the Prior Art

As one of telephone services, there is a Caller ID service. In this service, data communication of the caller ID is performed according to the BELL 202 standard and the CCITT V.23 standard. In these standards, for the noise present on a telephone line, the ratio of a FSK signal to a noise is defined as 20 [dB]. Whereas, the amplitude of the FSK signal to be received is defined as −32 [dBm] to −12 [dBm]. For this reason, in the data communication of the caller ID, the noise amplitude to be removed varies according to the FSK signal amplitude.

As a demodulation method of FSK, there is a zero-crossing method. With the zero-crossing method, the interval between the crossings across the line at an amplitude of zero of the FSK signal, i.e., the time of half period is determined to discriminate between two carrier frequencies. With such a method for determining the half period, the amplitude level of the FSK signal is not involved in demodulation. Therefore, the noise in the same frequency band as the FSK signal is demodulated.

For preventing the noise from being demodulated as a signal, in the prior-art method, the noise amplitude level to be removed is preset, and an amplitude smaller than the amplitude level is regarded as a noise, and removed. However, even in this case, when the noise amplitude also varies in accordance with the input signal amplitude as the Caller ID service, it is not possible to completely remove the noise, or even the FSK signal which should not be removed is erroneously removed.

When the Caller ID is transmitted, a noise is also present together with the FSK signal. However, with a prior-art method, it is not possible to discriminate between the FSK signal and the noise. As a result, the noise has been erroneously demodulated. Further, with the prior-art method, it is not possible to detect the completion of FSK. With the prior-art method, whether it is the Caller ID or a noise has been judged based on the demodulation result.

With the prior-art method, for removing a noise from the FSK signal, the component having a smaller amplitude than the preset amplitude is removed as the noise. Such a prior-art method may not be applicable to removal of the noise present during a period in which the FSK signal is not transmitted, and varying in amplitude in accordance with the FSK signal amplitude. This is for the following reason. The minimum amplitude of the signal may be smaller than the amplitude of the noise at the time of the maximum signal amplitude. In this case, not only the noise but also even the signal are removed.

Further, with digital FSK, respective digital values of "1" and "0" are set to correspond to either of two different frequencies, however, the two signals may be different in amplitude from each other. In such a case, the FSK signal having a smaller amplitude in accordance with the FSK signal amplitude may be erroneously removed as a noise.

BRIEF SUMMARY OF THE INVENTION

Object of the Invention

An object of the present invention is to provide a FSK demodulation system capable of changing the noise amplitude to be removed in accordance with the amplitude level of the input signal.

SUMMARY OF THE INVENTION

A FSK demodulation system of the present invention has a means for comparing two preset values across 0, a positive side level shift amount and a negative side level shift amount, with an inputted amplitude level; and a demodulation means for performing demodulation based on the comparison result.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1:
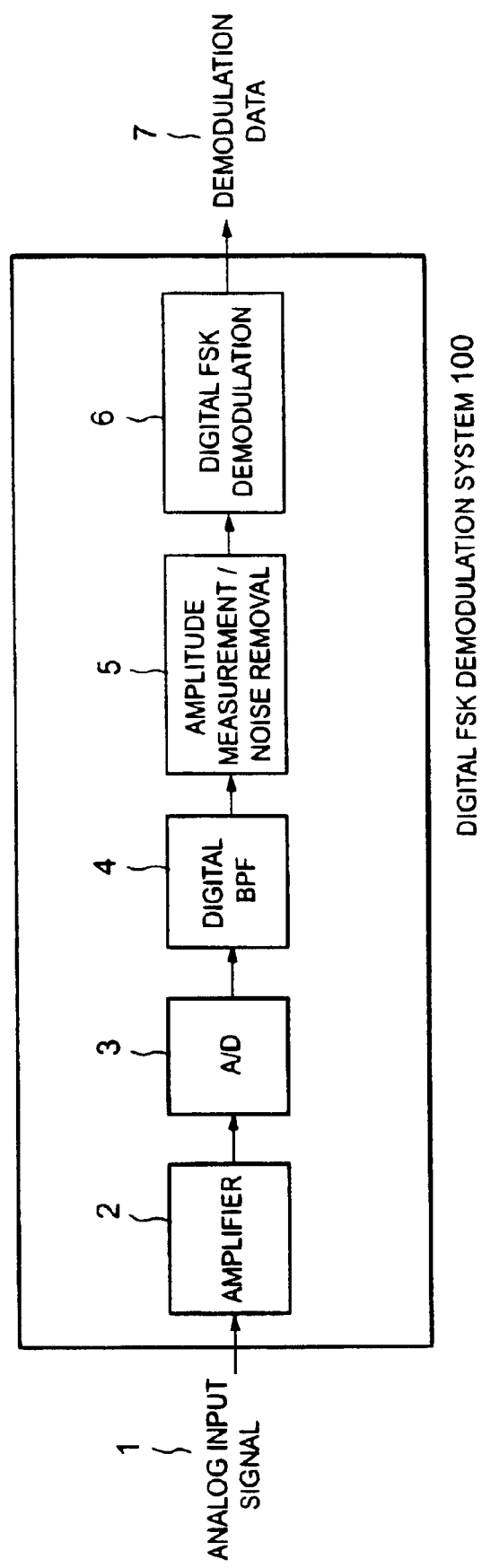
FIG. 1 is a block diagram for illustrating a configuration of a digital FSK demodulation system 100 which is a first example of the present invention.

A digital FSK demodulation system 100 which is a first example of the present invention will be described by reference to FIG. 1.

In the digital FSK demodulation system 100, an analog input signal 1 is inputted to an amplifier 2 having a function of amplifying or attenuating the amplitude, and a function of a low-pass filter. An output from the amplifier 2 is converted into a digital value by an A/D converter 3 (A/D). Then, by a digital bandpass filer 4 (digital BPF) whose passband is the FSK signal frequency band, the frequency component in the stopband of the digital BPF 4 contained in the signal is attenuated.

The FSK signal which passed through the BPF 4, and the noise of the frequency component in the passband of the digital BPF 4 are inputted to an amplitude measurement/ noise removal block 5. In the amplitude measurement/noise removal block 5, the amplitude level to be removed as a noise is preset. The amplitude measurement/noise removal block 5 measures the inputted signal amplitude, and changes the preset amplitude level to be removed according to the measurement result. As a result, it becomes possible to detect that the FSK signal has not been transmitted any longer after inputting of the FSK signal.

A digital FSK demodulation block 6 demodulates the output from the amplitude measurement/noise removal block 5. The digital FSK demodulation block 6 is the circuit for performing the demodulation even when there exists a noise in the same frequency band as the FSK signal, and within the range defined under the standard simultaneously with the FSK signal, and outputs demodulation data 7.

Thus, in the present invention, the removable noise amplitude level is preset, and after measuring the input signal amplitude, the setting of removable noise amplitude level is automatically changed according to the amplitude level. As a result, it is possible to remove even the noise changing in amplitude in accordance with the change in FSK signal amplitude.

Figure 2:
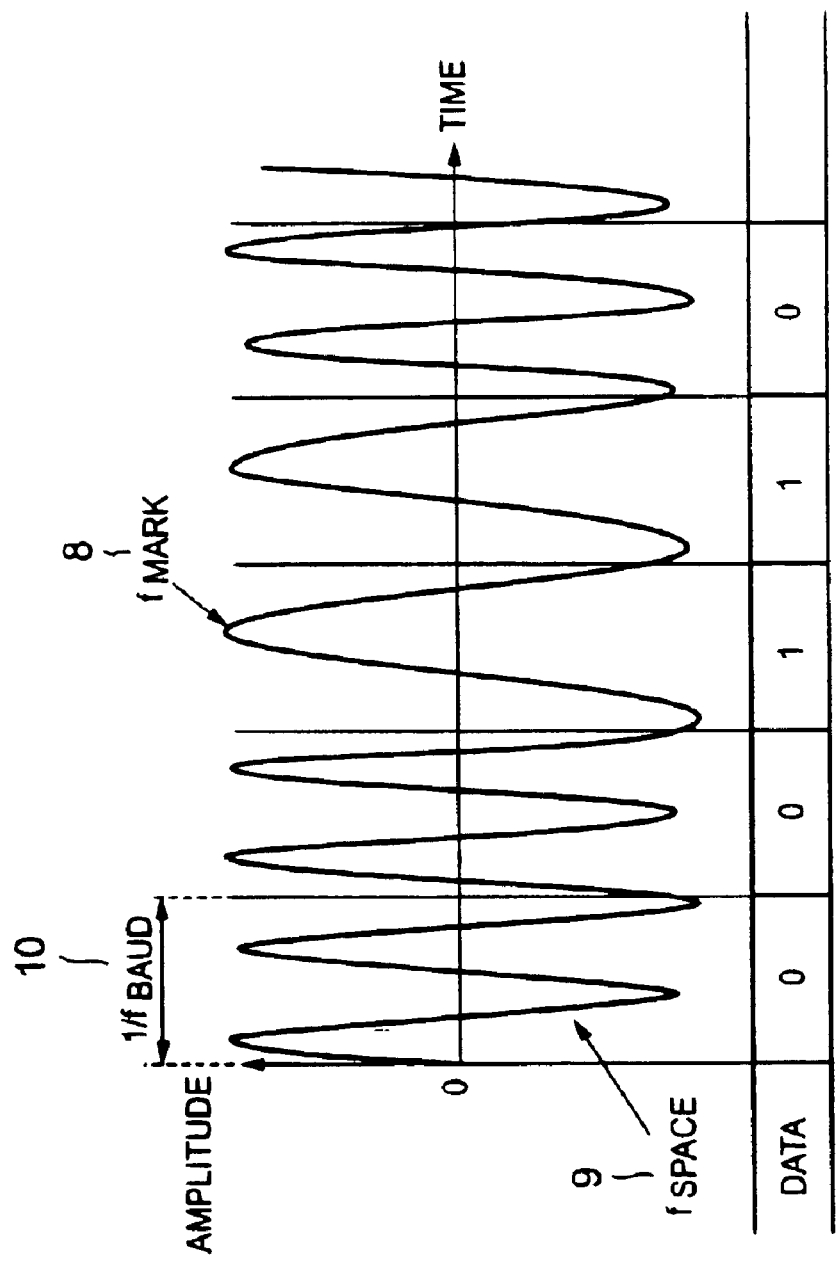
FIG. 2 is a diagram for illustrating the corresponding relationship between the wavelength of a FSK signal and a digital value.

Then, a description will be given to a demodulation method by means of the digital FSK demodulation system 100. With FSK (frequency shift keying), binary digital values of "1" and "0" are set to respectively correspond to mutually different frequencies, and transmitted with continuous phase at a prescribed transmission rate to perform data communication. As shown in FIG. 2, the frequency of a Mark signal corresponding to data "1" is referred to as fmark 8, and the frequency of a Space signal corresponding to data "0" is referred to as fspace 9. Further, the transmission rate is referred to as fbaud 10.

Figure 3:
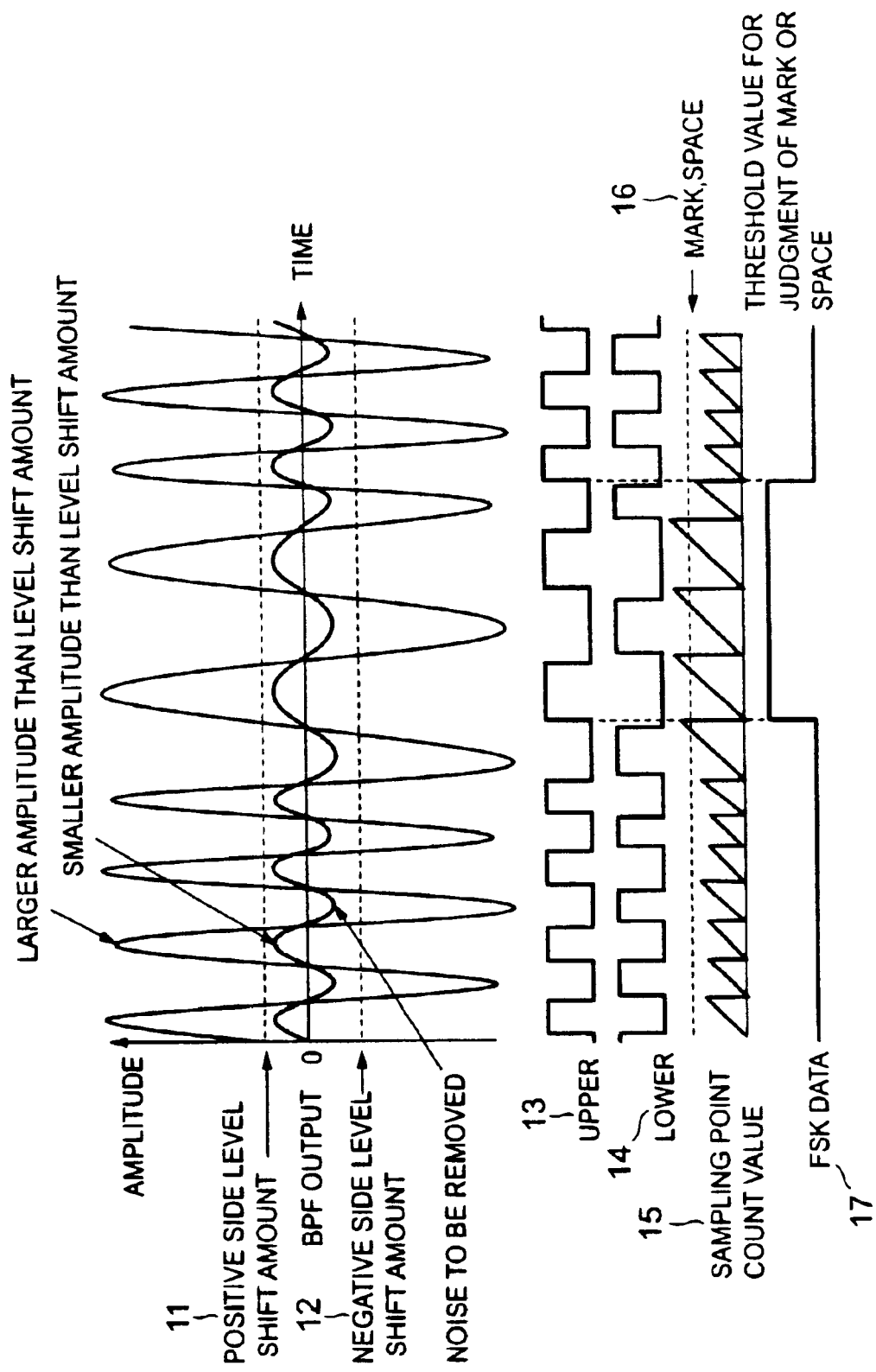
FIG. 3 is a diagram for illustrating the demodulation in accordance with the present invention.

As shown in FIG. 3, with the digital FSK demodulation system 100, the positive side level shift amount 11 and the negative side level shift amount 12 are set. This is for removing the signal having an amplitude level within the range between the positive side level shift amount 11 and the negative side level shift amount 12 as a noise. The amplitude measurement/noise removal block 5 compares the positive side level shift amount 11 and the negative side level shift amount 12 with the inputted amplitude level to output a flag. The flag which becomes "1" for the amplitude larger than the positive side level shift amount 11 is referred to as upper 13. The flag which becomes "1" for the amplitude smaller than the negative side level shift amount 12 is referred to as lower 14. Incidentally, the signal waveform shown in FIG. 3 is illustrated in analog waveform. However, the signal actually outputted from the digital BPF 4 is the discrete value sampled at a given frequency.

The digital FSK demodulation block 6 which received the flags upper 13 and lower 14 from the amplitude measurement/noise removal block 5 generates a sampling point count value 15, and outputs a demodulation result based on the sampling point count value 15. As for the sampling point count value 15, the counter value is cleared at the leading edge of the upper 13 or at the leading edge of the lower 14, and the sampling frequency of the digital BPF 4 is used as a count clock. If the sampling point count value 15 is not less than a prescribed threshold value for judgment 16 at the leading edge of the upper 13 or the lower 14, it is judged as the Mark signal. Conversely, if the sampling point count value 15 is not more than the threshold value for judgment 16, it is judged as the Space signal. The comparison result between the sampling point count value 15 and the threshold value for judgment 16 is outputted as a fskdata 17. In other words, the digital FSK demodulation system 100 measures the interval between the leading edge of the upper 13 and the leading edge of the lower 14, and thereby measures the half period of the input signal, to perform demodulation.

A description will be now given to a method for calculating the threshold value for judgment 16 by taking as an example the case where the digital FSK demodulation system 100 is applied to FSK defined in CCITT V.23 and BELL 202. In CCITT V.23, fmark 8=1200 [Hz], fspace 9=2200 [Hz], and fbaud 10=1200 [Hz]. Herein, assuming that the sampling frequency of the digital BPF 4 is 56000 [Hz], the number of sampling points contained in the half period of the Mark signal during the period in which one data is transmitted is 56000/1200/2=about 23. Whereas, the number of sampling points contained in the half period of the Space signal during the same period is 56000/2200/2= about 13. Accordingly, a number of sampling points of 18 which is the intermediate value between the two values is set to be used as the threshold value for judgment 16 for the Mark signal and the Space signal. The digital FSK demodulation system 100 includes a resistor for storing the threshold value for judgment 16. It is noted that the fskdata 17 is the demodulation result with no consideration given to the transmission rate. Therefore, for precise demodulation, the system 100 is further required to have a counter for the transmission rate for measuring the transmission rate of one data, and a threshold value for the transmission rate, as well as to include a correction circuit for the error generated at the time of counting of the transmission rate.

Figure 4:
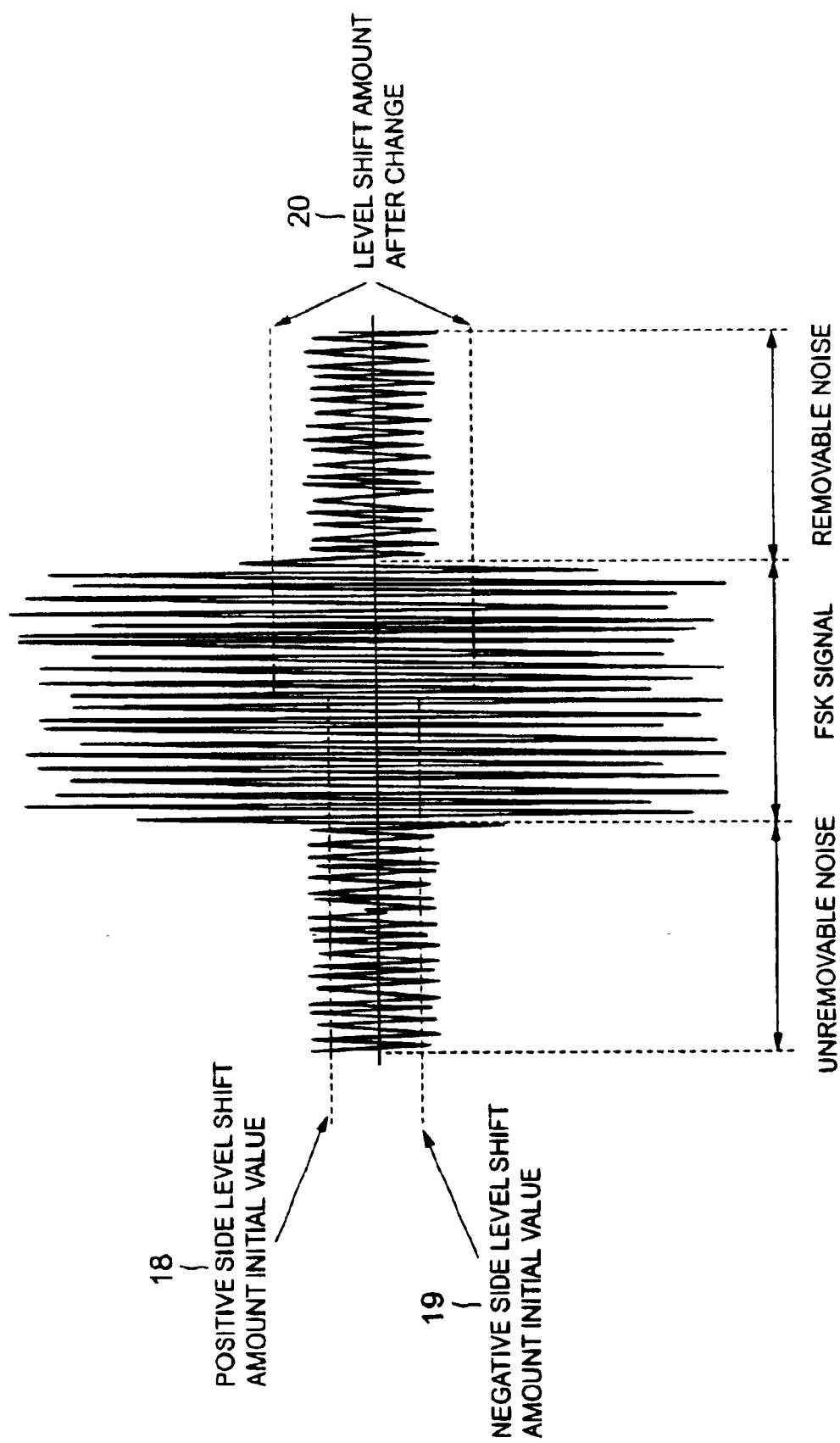
FIG. 4 is a diagram for illustrating the relationship between the level shift amount and the amplitude of a removable noise.

Then, the change in level shift amount will be schematically described by reference to FIG. 4.

The amplitude measurement/noise removal block 5 includes a resistor for presetting the initial value of the noise amplitude to be removed. In this resistor, as the initial value on the positive side of the noise amplitude level to be removed, a positive side level shift amount initial value 18 is preset. Whereas, as the initial value on the negative side of the noise amplitude level to be removed, a negative side level shift amount initial value 19 is preset. Each of periods T1 and T3 is the period for only a noise, and a period T2 is the period in which the FSK signal is present.

At first, in the period T1, the amplitude of the noise exceeds the level shift amounts 18 and 19. At this time, the amplitude measurement/noise removal block 5 does not remove the noise. The digital FSK demodulation block 6 executes a FSK demodulation operation on the noise. Further, the digital FSK demodulation block 6 compares the demodulation result with a prescribed pattern. When both are in agreement with each other, the digital FSK demodulation block 6 instructs the amplitude measurement/noise removal block 5 to change the level shift amounts. In FIG. 4, the level shift amounts are changed within the period T2. In the period T3, the amplitude measurement/noise removal block 5 determines whether the noise should be removed or not based on level shift amounts 20.

By changing the level shift amounts in this manner, it is possible to remove the noise within a range interposed between the positive and negative level shift amounts 20 after changing.

Figure 5:
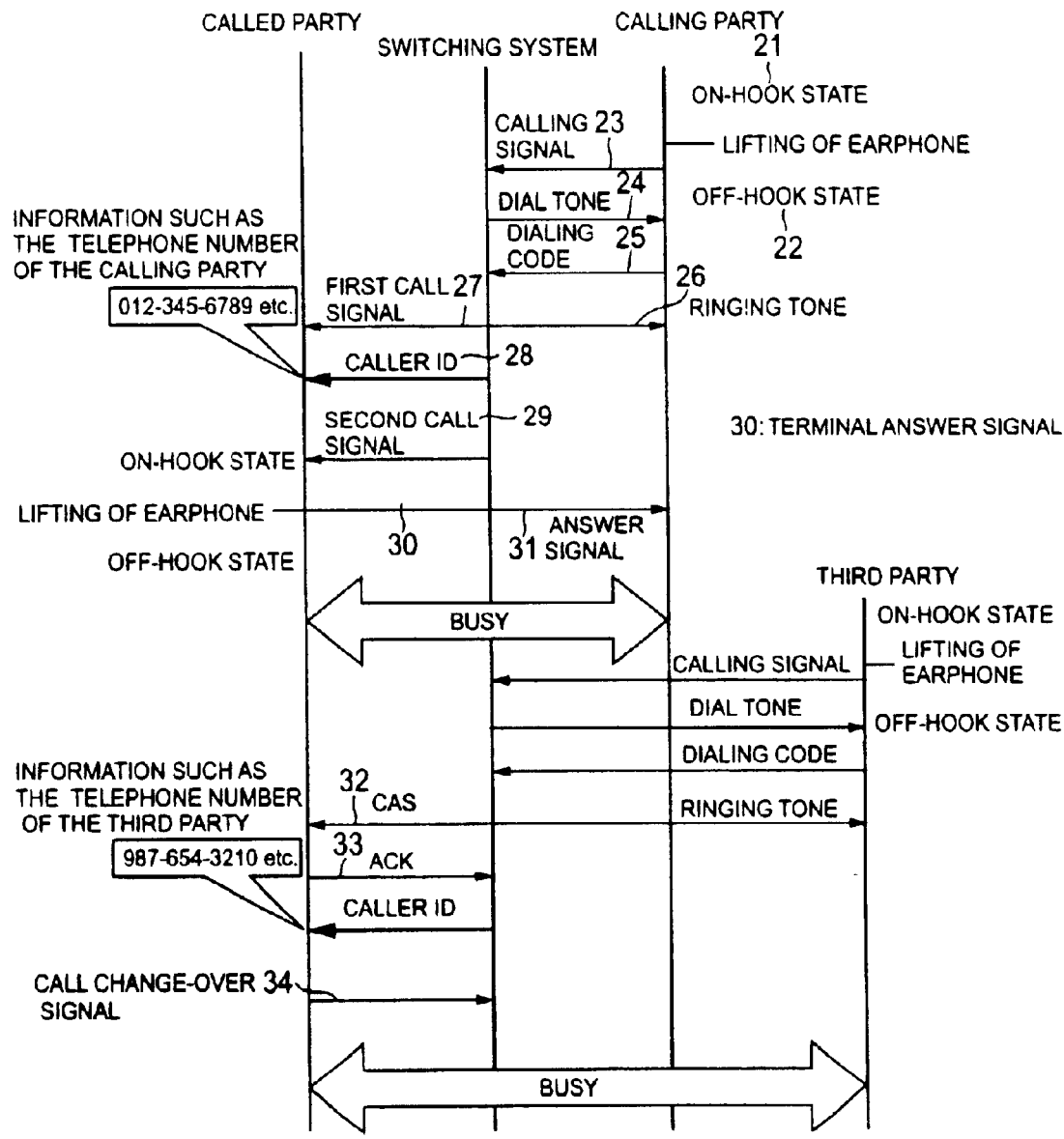
FIG. 5 is a diagram for illustrating the transmission and the reception of signals between a calling party, a switching system, a called party, and a third party from calling to speaking.

Then, by taking the Bellcore standard (SR-TSV-002476) which is one standard of the Caller ID service as an example, the timing at which the caller ID is transmitted will be described by reference to FIG. 5. The state before the instant when a calling party lifts an earphone is referred to as an ON-HOOK state 21, and the state after lifting of the earphone is referred to as an OFF-HOOK state 22. The signal for notifying a switching system that the calling party has lifted the earphone, and the phone goes into the OFF-HOOK state 22 is a calling signal 23. A dial tone 24 is transmitted from the switching system which received the calling signal 23 to the calling party. The calling party transmits a dialing code 25 of the called party to the switching system. A first call signal 27 is transmitted from the switching system to the called party, and a caller ID 28 of the calling party is transmitted to the called party subscribing to the Caller ID service. During transmission of the call signal to the called party, a ringing tone 26 is transmitted to the calling party. The called party lifts the earphone, so that the calling party and the called party are in communication.

Further, when the calling party subscribes the service which enables the subscriber to receive an interrupt call from a third party while being on line, after the third party transmitted the dialing code of the called party to the switching system, CAS32 is transmitted from the switching system to the called party, which notifies the called party telephone that there has been the interrupt call from the third party. The CAS32 signals are the signals having two frequency components to be simultaneously transmitted, wherein the signal having a higher frequency is referred to as CAS-H, and the signal having a lower frequency is referred to as CAS-L. The frequency of the CAS-H is 2750 [Hz], and the frequency of the CAS-L is 2130 [Hz]. The called party telephone which received the CAS32 transmits ACK33 to the switching system. The switching system which received the ACK33 transmits the caller ID of the third party to the called party. When the called party decides to receive a call from the third party, a call change-over signal is transmitted to the switching system, so that communication between the called party and the third party is achieved.

Figure 6:
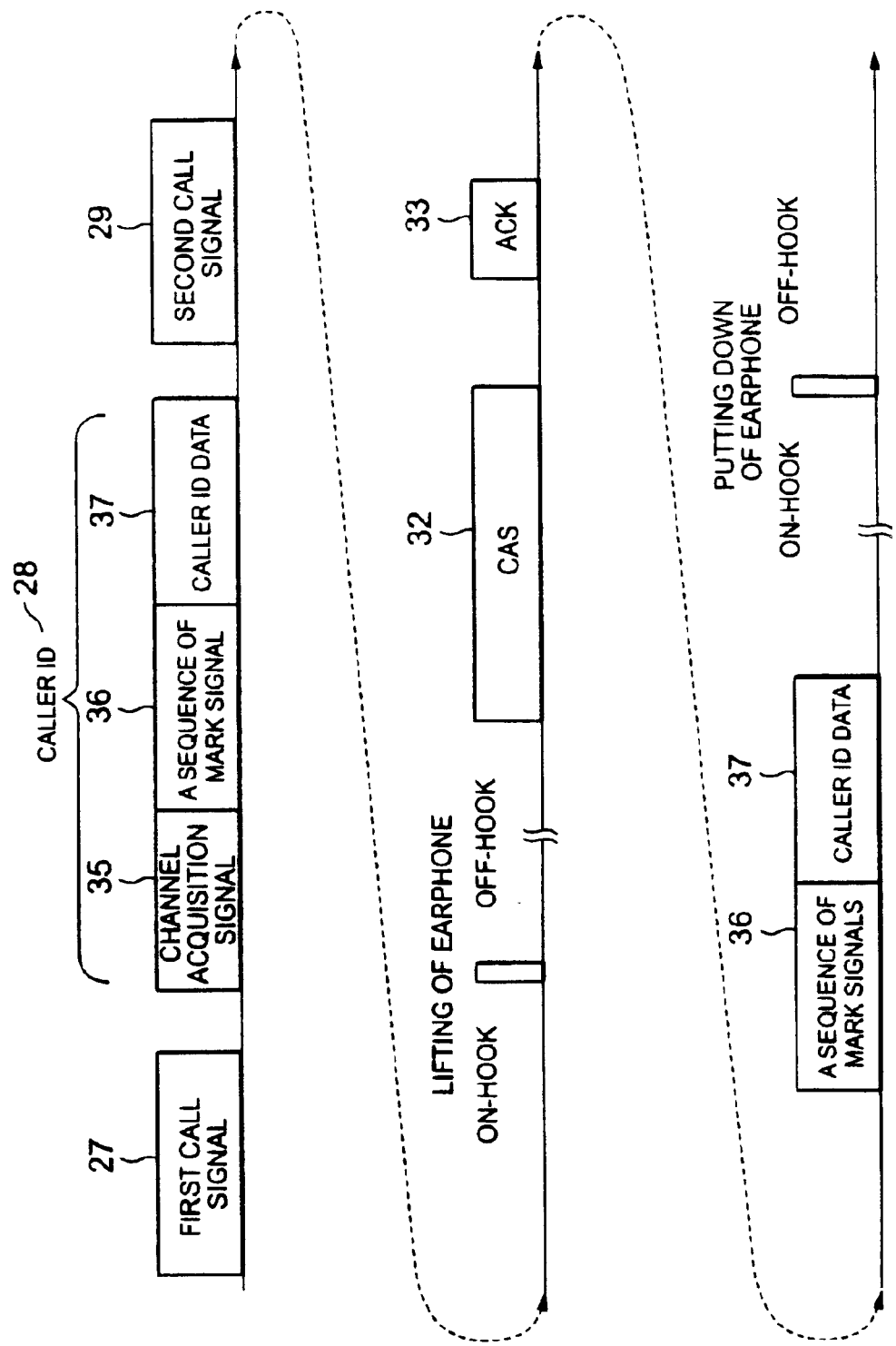
FIG. 6 is a diagram for illustrating the reception timing of caller ID data 37.

The configuration of the caller ID 28 to be transmitted will be described by reference to FIG. 6. The caller ID 28 is transmitted from after the first call signal 27 until before the second call signal 29. The caller ID 28 is made up of a channel acquisition signal 35, a sequence of Mark signals 36, and caller ID data 37. The channel acquisition signal 35 is the signal transmitted in such a manner as to be alternately data "1" and "0". The sequence of Mark signals 36 are the signals transmitted in such a manner as to be continuously data "1". Further, in the service for displaying the caller ID 28 of a third party at the time of an interrupt call from the third party during communication between two parties, first, the CAS32 indicative of the interrupt from the third party is transmitted, and the ACK33 indicative of reception thereof is transmitted backed to the switching system. Then, the caller ID 28 is transmitted in a configuration of the sequence of Mark signals 36 and the caller ID data 37.

Figure 7:
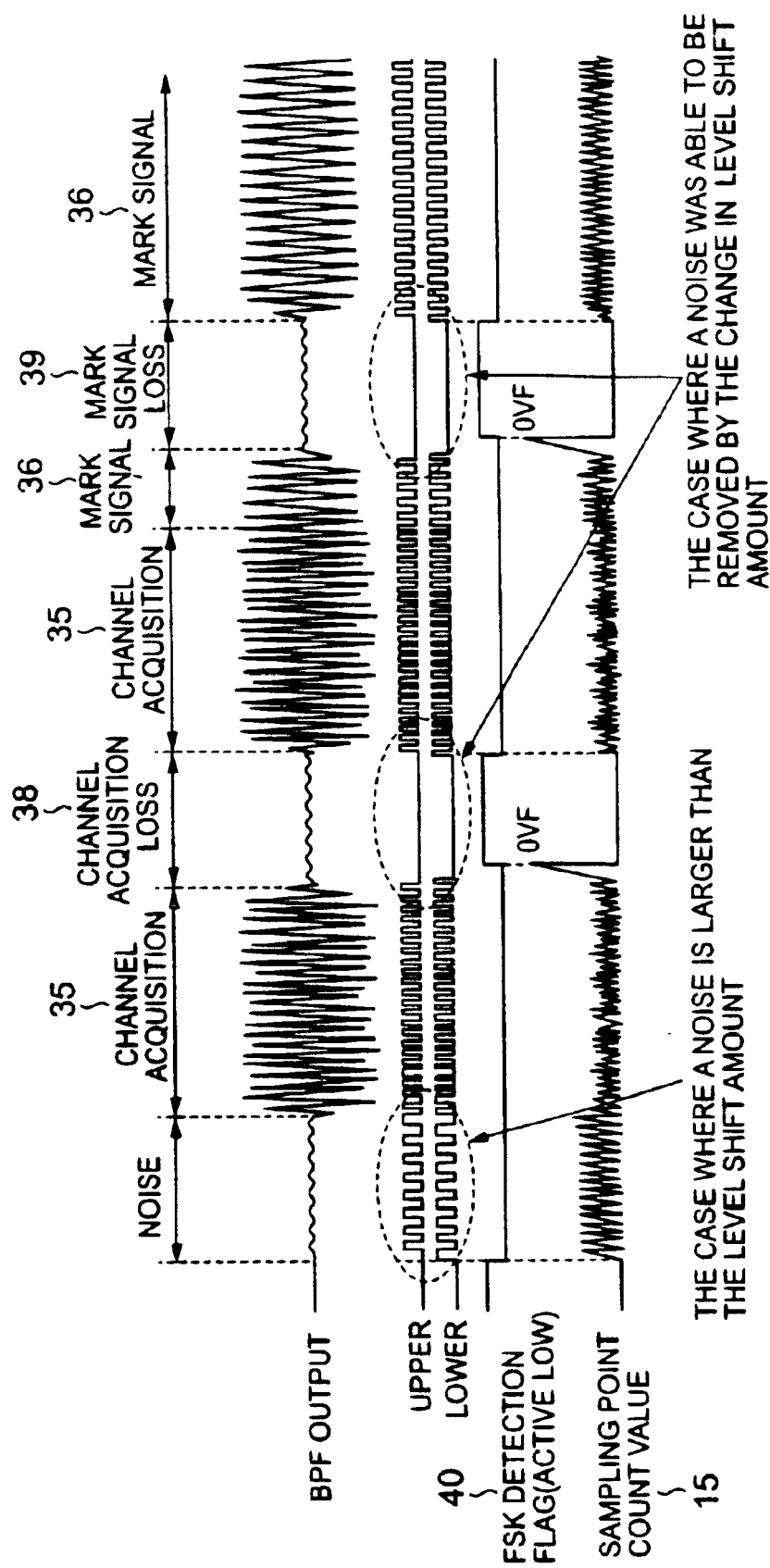
FIG. 7 is a diagram for illustrating the timing for changing the level shift amounts.

Referring to FIG. 7, a description will be given to the conditions under which the positive and negative level shift amounts are changed. Herein, FSK demodulation after the first call signal 27 will be described as an example. The digital FSK demodulation block 6 starts to operate in response to a signal from a circuit for detecting the call signal. However, there is a period in which only a noise is transmitted after the start of demodulation operation. When the amplitude of the noise in this period exceeds the initial values of the positive and negative level shift amounts, the positive and negative level shift amounts are changed.

The periods which should be discriminated from the period in which only a noise is transmitted include channel acquisition loss 38 and Mark signal loss 39. After the period of only a noise, the FSK signal is transmitted in the order of the channel acquisition signal 35, the sequence of Mark signals 36, and the caller ID data 37 (not shown). The channel acquisition loss 38 is generated due to interruption of the channel acquisition signal 35 during transmission. Similarly, the Mark signal loss 39 is generated due to interruption of the sequence of Mark signals 36 during transmission. For example, if the time regarded as the channel acquisition loss 38 is preset, and at the time of detecting the channel acquisition loss 38, how long the period lasts is determined, it becomes possible to discriminate the period from a noise. In the initial period of only a noise, the noise has been unremovable. Therefore, it is possible to determine the inputted amplitude level before generation of the channel acquisition loss 38, and to change the level shift amounts into the value in accordance with the amplitude, it is possible to detect the channel acquisition loss 38.

At the time of an interrupt from a third party, the channel acquisition signal 35 is not transmitted. Therefore, such a configuration as to enable the following operation is implemented. Namely, even during the period in which the sequence of Mark signals 36 are transmitted, it is possible to determine the inputted amplitude level, and to change the level shift amounts according to the amplitude.

Figure 8:
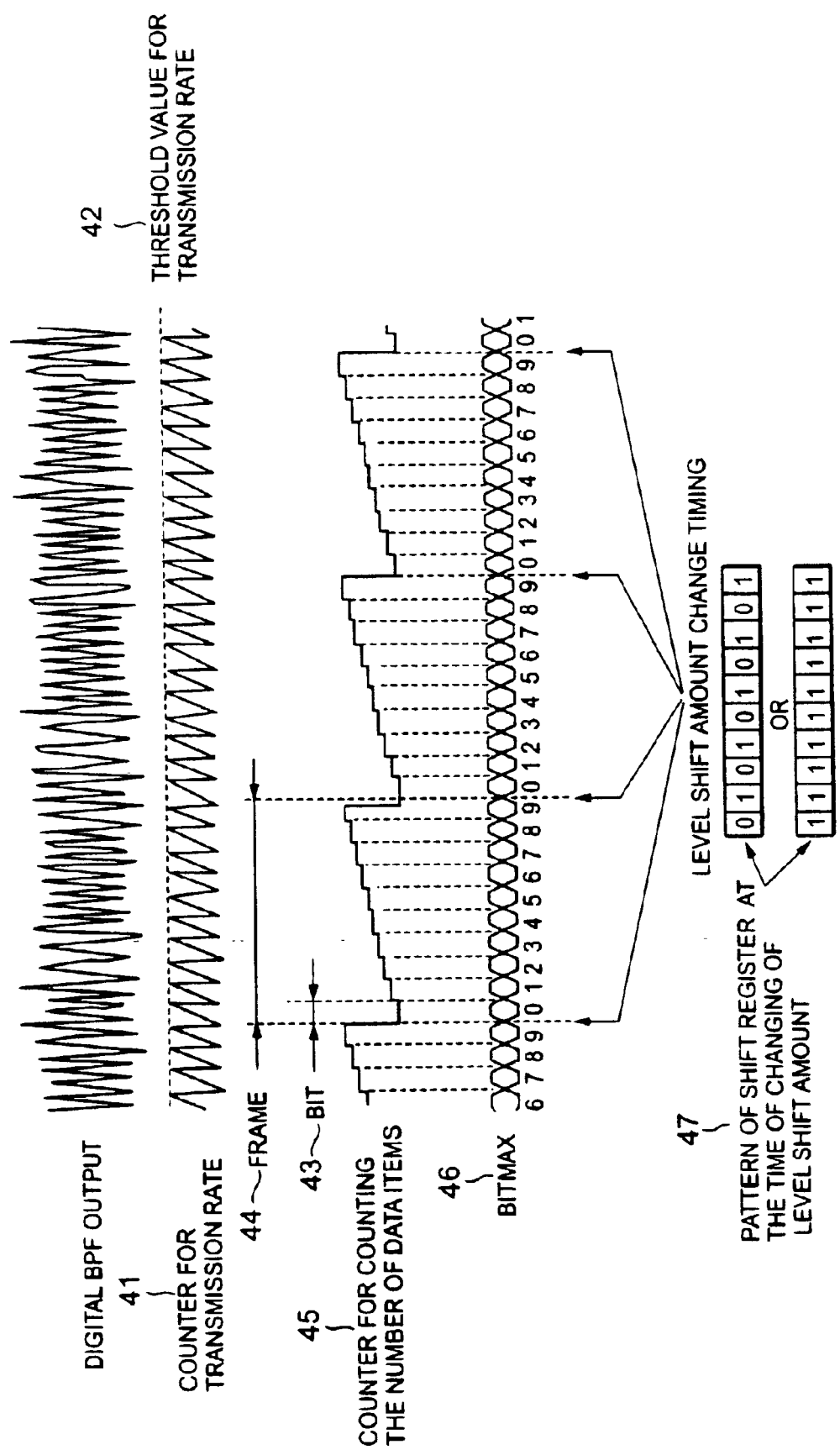
FIG. 8 is a diagram for illustrating the timing for changing the level shift amounts.

Referring to FIG. 8, a description will be given to the timing for changing the level shift amounts. When the demodulation result from the digital FSK demodulation block 6 is in agreement with either of the channel acquisition signal 35 and the sequence of Mark signals, the amplitude measurement/noise removal block 5 changes the level shift amounts according to the inputted amplitude.

When the channel acquisition signal 35 is demodulated at the FSK demodulation circuit, a 10-bit shift register has a pattern of "1010101010". A counter 45 for counting the number of data items is the counter which is cleared to 0 when 10 data items have been transmitted to the shift register, and restarts counting. At the timing at which the shift register value is "1010101010" when the value of the counter 45 for counting the number of data items becomes 9, the change in level shift amounts according to the inputted amplitude is performed.

Similarly, for the sequence of Mark signals, at the timing at which the value of the shift register is "1111111111" when the value of the counter 45 for counting the number of data items becomes 9 at the tenth data item wherein it counts the first data item as 0, the change in level shift amounts according to the inputted amplitude is performed.

During the period in which the caller ID is transmitted, the change in level shift amounts is not performed. This is for preventing the FSK demodulation from being erroneously performed by the change in level shift amounts. The change in level shift amounts is made until the period of the sequence of Mark signals 36.

Referring again to FIG. 8, a description will be given to a method for calculating the level shift amount. It is noted that the period in which one data item is transmitted is referred to as bit 43. The period in which 10 data items are transmitted is referred to as frame 44. The maximum value of the amplitude during the period bit 43 is referred to as bitmax 46.

According to the standard of Bellcore (SR-TSV-002476), the S/N ratio of the FSK signal to a noise is defined as 20 [dB]. In other words, the amplitude of the FSK signal is 10 times the amplitude of the noise. Whereas, the FSK signal amplitude is defined as −36 [dBm] to −12 [dBm]. Therefore, at the time when the FSK signal amplitude is a maximum of −12 [dBm], the noise amplitude is allowed to be up to −32 [dBm]. Assuming that the initial value of the level shift amount is set to be −32 [dBm], and the signals having an amplitude smaller than this are set to be removed, the result is that the FSK signal is removed when the amplitude of the FSK signal is −36 [dBm]. For avoiding this, the initial value of the level shift amount is required to be set at such a level as not to remove the FSK signal. Further, according to the same standard, as for the ratio of the Mark signal amplitude to the Space signal amplitude (twist), the maximum value is defined as 10 [dB] wherein the case where the Mark signal is larger than the Space signal is defined as positive twist. Therefore, when the Mark signal amplitude is assumed to be 1, the space signal amplitude is about 0.3, and the noise amplitude is 0.1.

Therefore, for example, it is possible to set the level shift amount at ¼. If the positive and negative level shift amounts are set to be ¼ of the bitmax 46 when the timing of changing the level shift amount has come after determining the bitmax 46, the amplitude of less than 0.25 is removed. At this time, the noise is removable, and at the same time, the FSK signal will not be removed even for the maximum twist.

Figure 9:
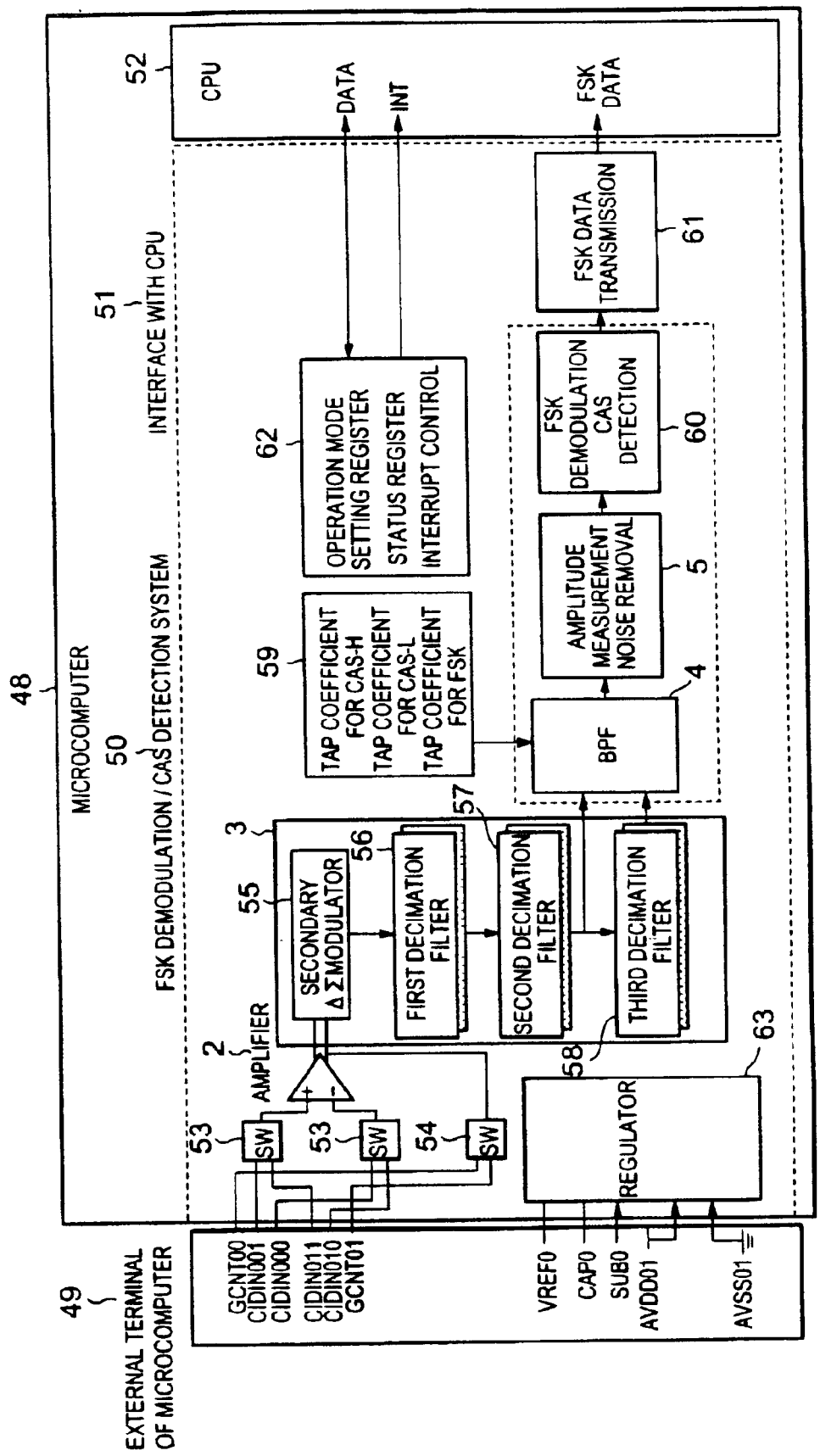
FIG. 9 is a diagram for illustrating a configuration of an example in accordance with the FSK demodulation system 100.

On example in accordance with a first example will be described by reference to FIG. 9. A microcomputer 48 which is one example includes therein the digital FSK demodulation system 100 as a FSK demodulation/CAS detection system 50.

It has change-over switches (SW) 53 for allowing input of analog signals of two systems from external terminals 49 of the microcomputer 48. Which signal is used out of the signals from respective input terminals can be set by an operation mode setting register 62. The system 50 has an amplifier capable of adjusting the gain control by an external circuit. It is possible to respectively set gains for the analog inputs of two systems, and a change-over switch (SW) 54 is switched simultaneously with the change-over SW 53 of the analog input signal.

An A/D converter 3 includes a secondary delta/sigma modulator 55 for converting the analog value of the output from the amplifier 2 into a 1-bit digital value, a first decimation filter 56, a second decimation filter 57, and a third decimation filter 58 for decreasing the sampling frequency of the output from the secondary delta/sigma modulator 55, and enhancing the precision. For FSK demodulation, the output from the second decimation filter 57 is used. Whereas, for CAS detection, the output from the third decimation filter 58 is used.

The digital BPF 4 has 3 tap coefficients 59 of a tap coefficient for FSK to operate for FSK demodulation, a tap coefficient for CAS-H and a tap coefficient for CAS-L to operate for CAS detection. By switching these tap coefficients 59 between during the FSK demodulation operation and during the CAS detection operation, one digital BPF 4 is capable of performing functions of 3 characteristics.

The output from the digital BPF 4 is inputted to the foregoing amplitude measurement/noise removal block 5. The output therefrom is inputted to a FSK demodulation/CAS detection block 60. In this block 60, the same circuit is shared between a circuit for performing FSK demodulation and a circuit for performing CAS detection. In order for the block 60 to perform respective functions, it has an operation mode setting register, which is controllable by a CPU. Further, it has a status register, which indicates a FSK transmission start request status, a FSK demodulation error status, and a FSK transmission error status. By generating an interrupt signal for the CPU, and reading the status register, it is possible to know the status of FSK demodulation. A FSKDATA transmission block 61 includes a buffer for holding 4 bytes of the demodulated FSK data.

A second example of the present invention will be described. When compared with the first example, it is different therefrom in the method for measuring the amplitude of the input signal serving as a reference for determining what value each level shift amount is changed into.

In the first example, the bitmax 46 within the frame 44 was set to be a reference value for changing of each level shift amount. In this case, if a noise in pulse with an unexpected amplitude is present with a shorter period than the frame 44, the level shift amount is changed based on the amplitude. The result may be that the FSK signal which should not be removed is removed.

Figure 10:
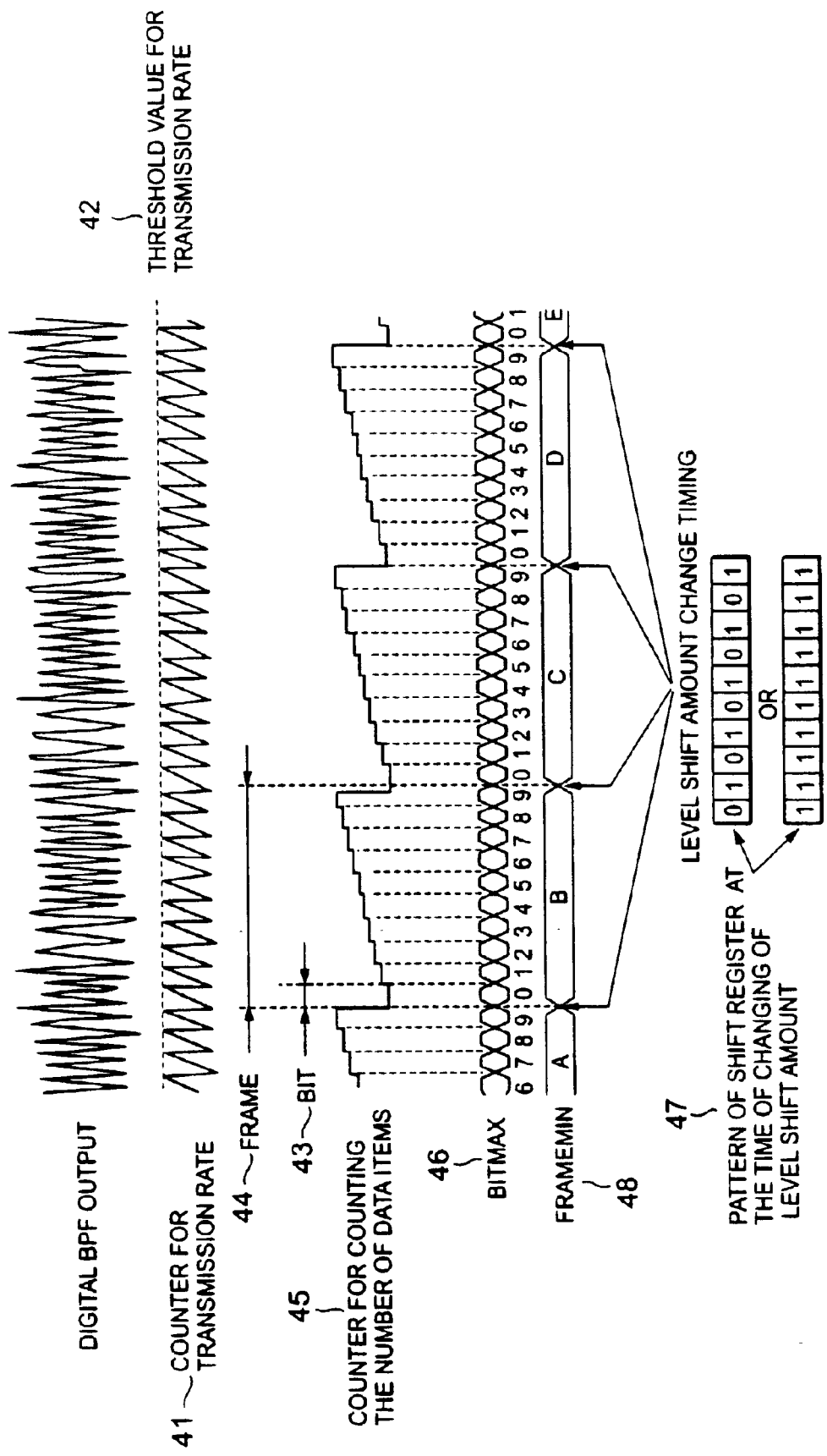
FIG. 10 is a diagram for illustrating a second example of the present invention.

In contrast, in the second example, as shown in FIG. 10, the period in which one data item is transmitted is referred to as bit 43, and the period in which 10 data items are transmitted is referred to as frame 44. The maximum value of the amplitude in the period bit 43 is referred to as bitmax 46. The minimum value of the bitmax 46 in the period frame 44 is referred to as framemin 48. This framemin 48 is used as a reference for determining what value the level shift amount is changed into. This allows removal of even a noise having a shorter period than the frame 44.

Figure 11:
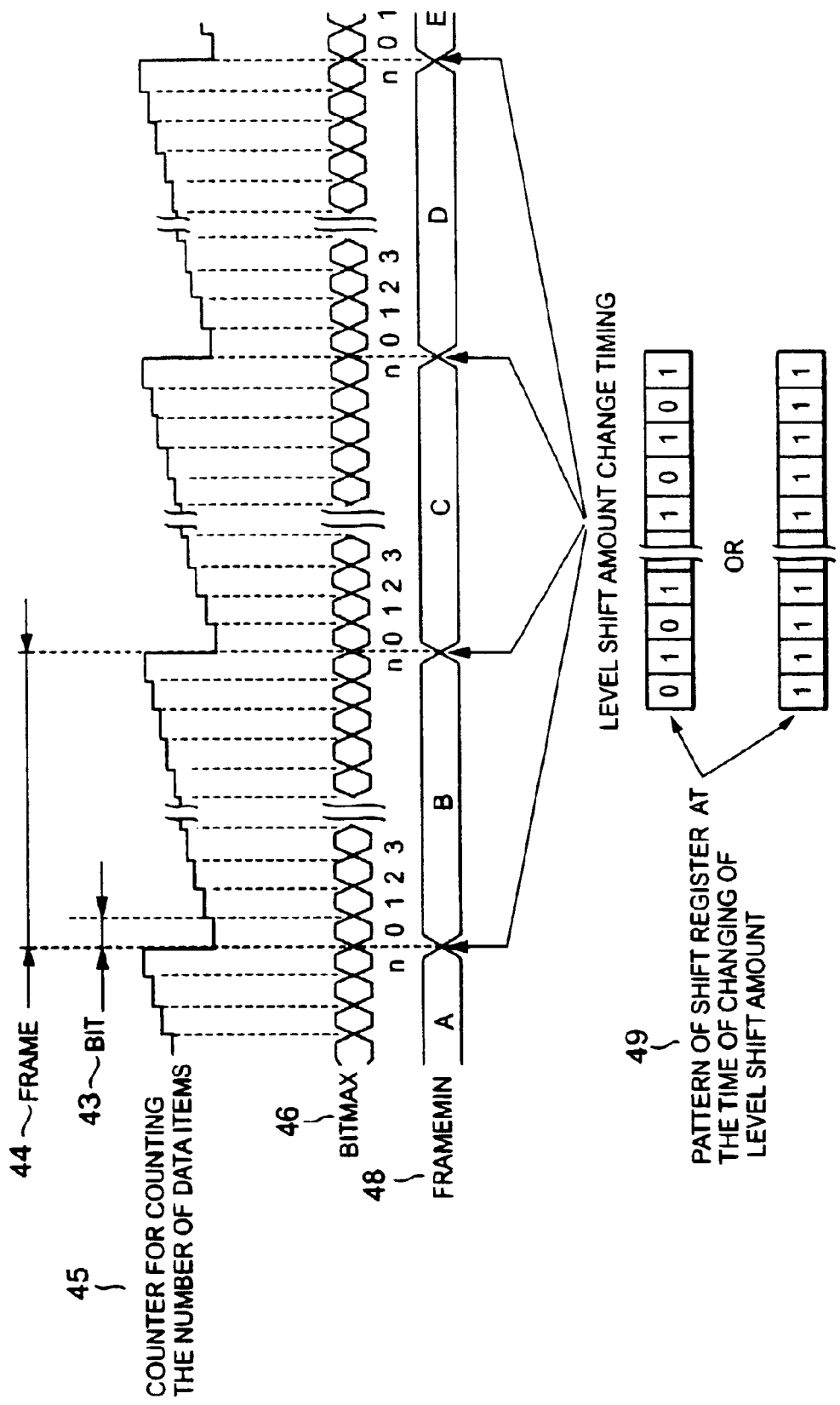
FIG. 11 is a diagram for illustrating a third example of the present invention.

A third example of the present invention will be described. When compared with the first example, it is different therefrom in timing for changing the level shift amount. In the first example, when the 10-bit shift register has a pattern of "1010101010" or "1111111111", the level shift amount was changed. In contrast, in the third embodiment, as shown in FIG. 11, when an n-bit register has a pattern of "1010 . . . nth bit" or "1111 . . . nth bit" (n is a natural number), the level shift amount is changed. For example, if n is set to be a smaller value than 10, it is possible to change the level shift amounts at a shorter time interval.

A fourth example of the present invention will be described. In the first example, the level shift amount was changed into ¼ of the bitmax 46. In contrast, in the fourth embodiment, the amount of change of the level shift amount is not limited to ¼ of the bitmax 46. A change is made into such a level shift amount as to remove the noise to be removed and not to remove the FSK signal which should not be removed. As a result, it becomes possible to remove the noise changing in amplitude in accordance with the FSK signal amplitude.

Figure 12:
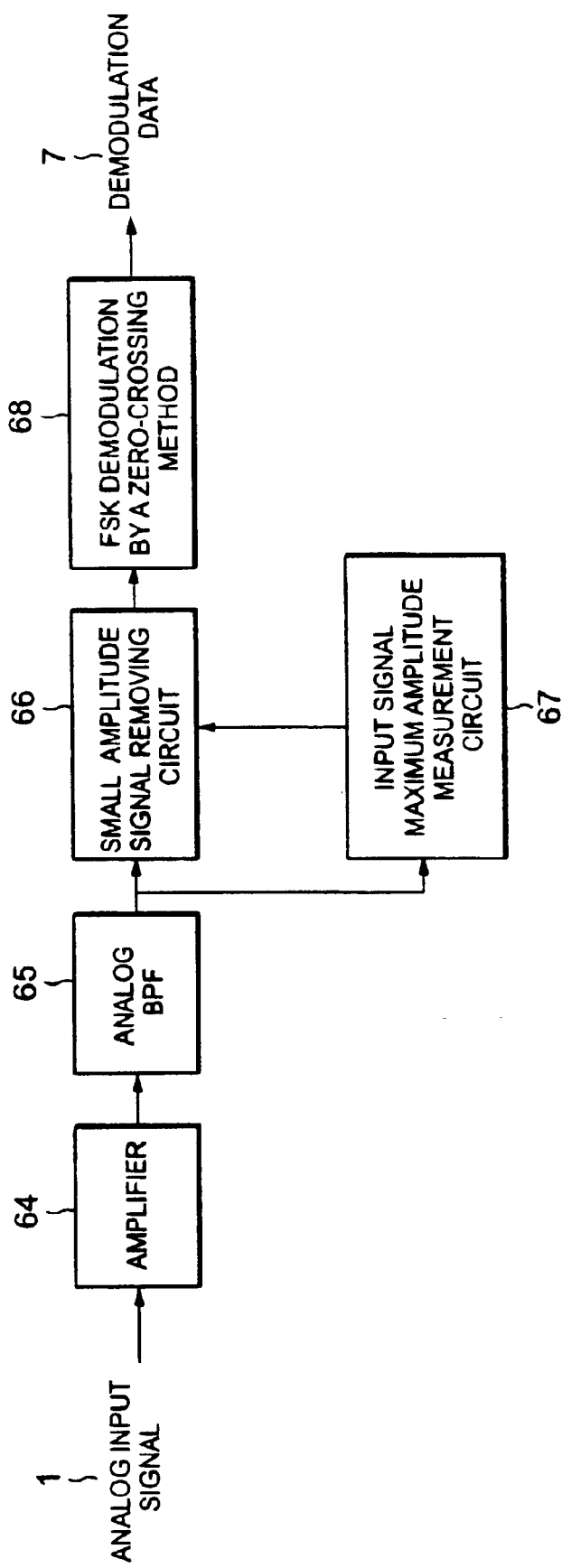
FIG. 12 is a diagram for illustrating a fifth example of the present invention.
Figure 13:
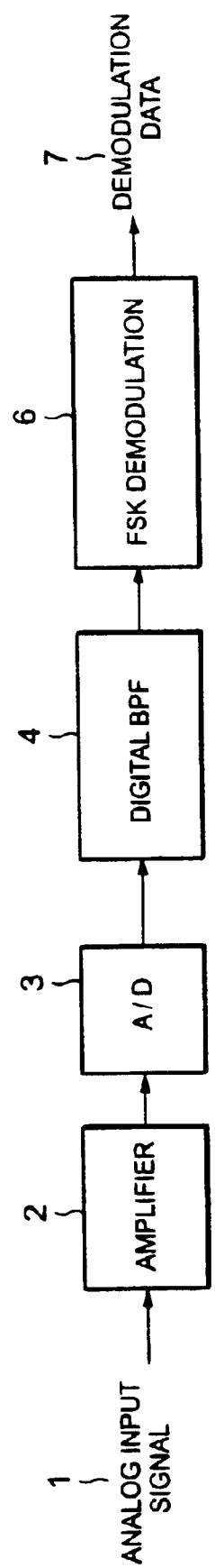
FIG. 13 is a diagram for illustrating one example of the present invention.

A fifth example of the present invention will be described by reference to FIG. 12. This example is so configured that the noise removal of the first example is implemented by means of an analog circuit. An analog input signal 1 is inputted to an amplifier 64 having a function of amplifying or attenuating the amplitude, and a function of a low-pass filter. As for an output from the amplifier 64, by an analog bandpass filer 65 (analog BPF) whose passband is the FSK signal frequency band, the frequency component in the stopband of the analog BPF 65 contained in the signal is attenuated. The FSK signal which has passed through the analog BPF 65, and the noise of the frequency component in the passband of the analog BPF 65 are inputted to a small amplitude signal removing circuit 66. At the same time, it is inputted to a block 67 (input signal maximum amplitude measurement circuit) for measuring the maximum value of the input signal amplitude. The small amplitude removing circuit 66 has a function of converting the amplitude of not less than a given set amplitude (level shift amount) to the voltage corresponding to "1", and the amplitude of less than the level shift amount to the voltage corresponding to "0". It is the circuit capable of changing the level shift amount with reference to the amplitude maximum value determined at the input signal maximum amplitude measurement circuit 67.

A sixth example of the present invention will be described by reference to FIG. 14. This example is the case where the present invention has been applied to demodulation of signals other than the FSK signal. The present invention is applicable to removal of the noise unremovable by a BPF or the like due to the same frequency band as the signal, as well as such a noise as to change in amplitude in accordance with the amplitude of the signal.

Figure 14:
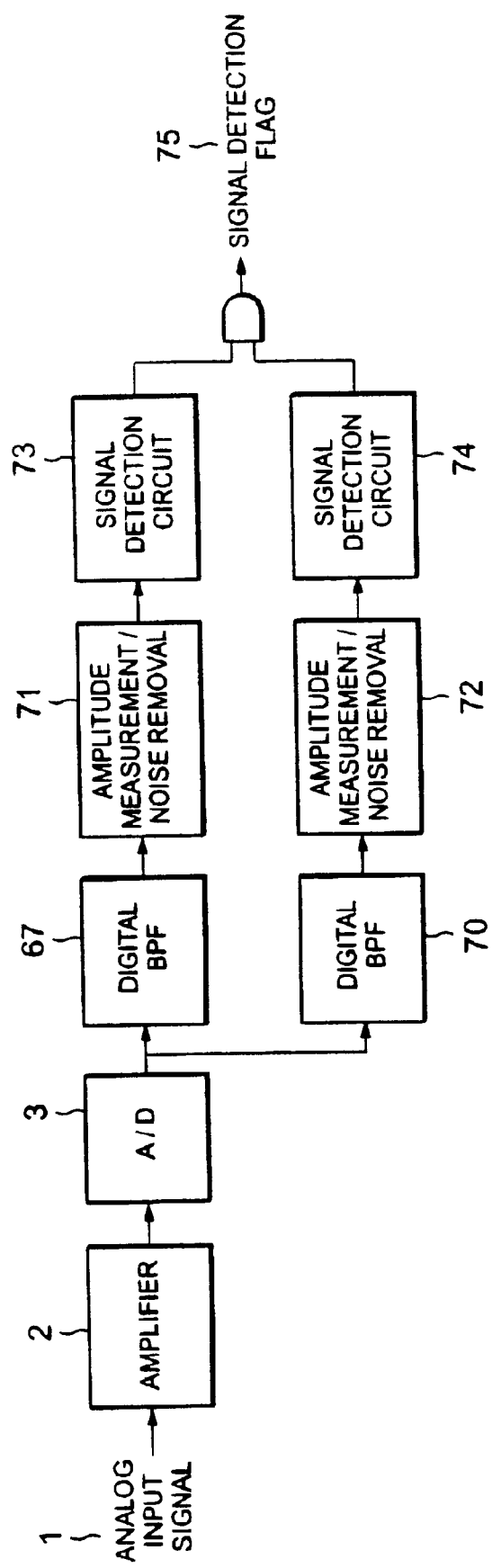
FIG. 14 is a diagram for illustrating a sixth example of the present invention.

For example, in the case where there is a necessity to detect whether a signal configured with given two frequencies such as DTMF is transmitted or not transmitted, as shown in FIG. 14, when the signals which passed digital BPFs 67 and 68 whose passbands are respective frequency bands include noises varying in amplitude in accordance with the signal amplitudes, it is possible to remove the noises by passing the signals through the amplitude measurement/noise removal blocks 71 and 72. Signal detection circuits 73 and 74 detect the respective signals being transmitted, and output a signal detection flag 75 indicating that the signals of two frequencies were simultaneously transmitted.

The amplitude measurement/noise removal block has a register for arbitrarily setting the initial value of the level shift amount, and is capable of switching the amount of change of the level shift amount based on the bitmax 46. When the circuit shown in the sixth example is used for the CAS detection circuit, by configuring the circuit so as to allow switching of operation control between the FSK demodulation circuit shown in each example of the first to fifth examples and this CAS detection circuit, it is possible to unify the amplitude measurement/noise removal blocks of the present invention. In such a case, by setting the initial value of each level shift amount, and the amount of change of the level shift amount at values suitable to both during FSK demodulation operation and during CAS detection operation, it is possible to perform processings on the two signals. For the foregoing reason, the effect of allowing the reduction in circuit scale is produced. Further, also for the amplifier 2, the A/D 3, and the digital BPF 4, it is possible to share the same circuit between the FSK demodulation circuit and the CAS signal detection circuit. Therefore, it is possible to further reduce the circuit scale.

As described above, the present invention was described based on the examples, which should not be construed as limiting the scope of the invention. It is needless to say that changes and modifications may be made within the knowledge of those skilled in the art.

In accordance with such a FSK demodulation system, it is possible to remove the noise changing in accordance with the FSK signal amplitude without removing the FSK signal which should not be removed even at the maximum twist. With a system not capable of removing the noise during the period in which no FSK signal is present, for example, during the period of the channel acquisition loss 38, when FSK demodulation is performed, and the signal which is not the channel acquisition 35 is transmitted after detecting the channel acquisition 35, the channel acquisition loss 38 must be judged based on the demodulation result. If the frequency of the noise is the same frequency as the channel acquisition 35, it is impossible to judge the signal as the channel acquisition loss 38 based on the demodulation result. With the noise removing method of the present invention, during the period in which no FSK signal is transmitted, judgment is not required to be made based on the demodulation result. It is possible to judge the presence or the absence of the FSK signal based on the FSK signal detection flag 40. Similarly, it is possible to know the case of the Mark signal loss 39 and the completion of transmission of the FSK signal based on the FSK signal detection flag 40. As a result, the load on a program is less. Further, it is possible to prevent the malfunction occurring when the noise frequency is equal to the FSK signal frequency.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A FSK demodulation system comprising:
   a comparison circuit for comparing two preset values across 0, a positive side level shift amount and a negative side level shift amount, with an inputted amplitude level; and
   a demodulation circuit performing demodulation based on the comparison result, and further comprising:
   a second comparison circuit comparing the demodulation result with a preset pattern; and
   a level shift amount changing circuit changing the positive side and negative side level shift amounts when the comparison result shows an agreement therebetween.

2. A system comprising:
   a register temporarily storing a removable amplitude level for a noise signal;
   a noise amplitude level setting circuit measuring an amplitude level of an input signal and changing a value of said register based on said amplitude level of said input signal;
   a data demodulation circuit generating demodulation data based on a result by comparing said value of said register with said amplitude level of said input signal.

3. The system according to claim 2, further comprising:
   a bandpass filter receiving said input signal and having a predetermined signal frequency passing band.

4. The system according to claim 2, wherein said data demodulation circuit compares said amplitude level of said input signal with said value of said register, and removes said input signal when said amplitude level of said input signal is smaller than said value of said register.

5. The system according to claim 4, wherein said data demodulation circuit demodulates said input signal based on a frequency of said input signal.

6. The system according to claim 5, wherein said data demodulation circuit determines a length of time between an instant when said amplitude level of said input signal has exceeded a positive level shift amount and an instant when it then reaches a negative level shift amount, or between an instant when said amplitude level of said input signal has exceeded said negative level shift amount and an instant when it then reaches said positive level shift amount and performing a demodulation based on the time.

7. The system according to claim 2, wherein said amplitude level setting circuit changes said value of said register when a comparison result comparing a demodulation result with a preset pattern shows an agreement therebetween.

8. The system according to claim 7, wherein said input signal includes a plurality of input signals, and said noise amplitude level setting circuit changes said value of said register based on a selected one of said plurality of input signals, and said selected one of said plurality of input signals has a maximum amplitude level.

9. The system according to claim 2, wherein said input signal is a FSK signal.

10. A method comprising:

receiving an input signal that includes a data signal and a noise signal;

setting a level for detecting said noise signal;

measuring an amplitude of said input signal;

changing said level from a first value to a second value in response to a result of measuring the amplitude of said input signal; and extracting said data signal from said input signal by sue of said second value.

11. The method according to claim 10, wherein said changing said level from a first value to a second value is performed by measuring an amplitude level of said noise signal.

12. The method according to claim 10, wherein said changing said level from a first value to a second value is performed by measuring an amplitude level of said data signal.

13. The method according to claim 12, further comprising:

generating demodulated data in response to said data signal, said level being changed from said first level to said second level during extracting said data signal from said input signal by use of said second value.

* * * * *